2 Sheets—Sheet 1.

J. C. STEAD.

FEED-WATER HEATERS FOR STEAM-BOILERS.

No. 7,228. Reissued July 18, 1876.

WITNESSES

Franck L. Durand

Philip. McNickle.

INVENTOR

James C. Stead

By L. Deane.

Attorney

N. PETERS, PHOTO-LITHOGRAPHER, WASHINGTON, D. C.

2 Sheets—Sheet 2.

J. C. STEAD.

FEED-WATER HEATERS FOR STEAM-BOILERS.

No. 7,228. Reissued July 18, 1876.

WITNESSES

Franck L. Durand

Philip McNickle

INVENTOR

James C. Stead.

By L. Deane

Attorney

N. PETERS, PHOTO-LITHOGRAPHER, WASHINGTON, D. C.

UNITED STATES PATENT OFFICE.

JAMES C. STEAD, OF GREEN POINT, NEW YORK.

IMPROVEMENT IN FEED-WATER HEATERS FOR STEAM-BOILERS.

Specification forming part of Letters Patent No. 175,193, dated March 21, 1876; reissue No. 7,228, dated July 18, 1876; application filed May 23, 1876.

*To all whom it may concern:*

Be it known that I, JAMES CURTIS STEAD, of Green Point, in the county of Kings and State of New York, have invented certain new and useful Improvements in Steam-Boiler Feed-Water Heater; and I do hereby declare that the following is a full, clear, and exact description thereof.

The nature of my invention consists in the construction and arrangement of an attachment for steam-boilers, for the purpose of supplying the same with hot water and increasing the heating-surface, as will be hereinafter more fully set forth.

In order to enable others skilled in the art to which my invention appertains to make and use the same, I will now describe its construction and operation, referring to the annexed drawings, in which—

Figure 1:
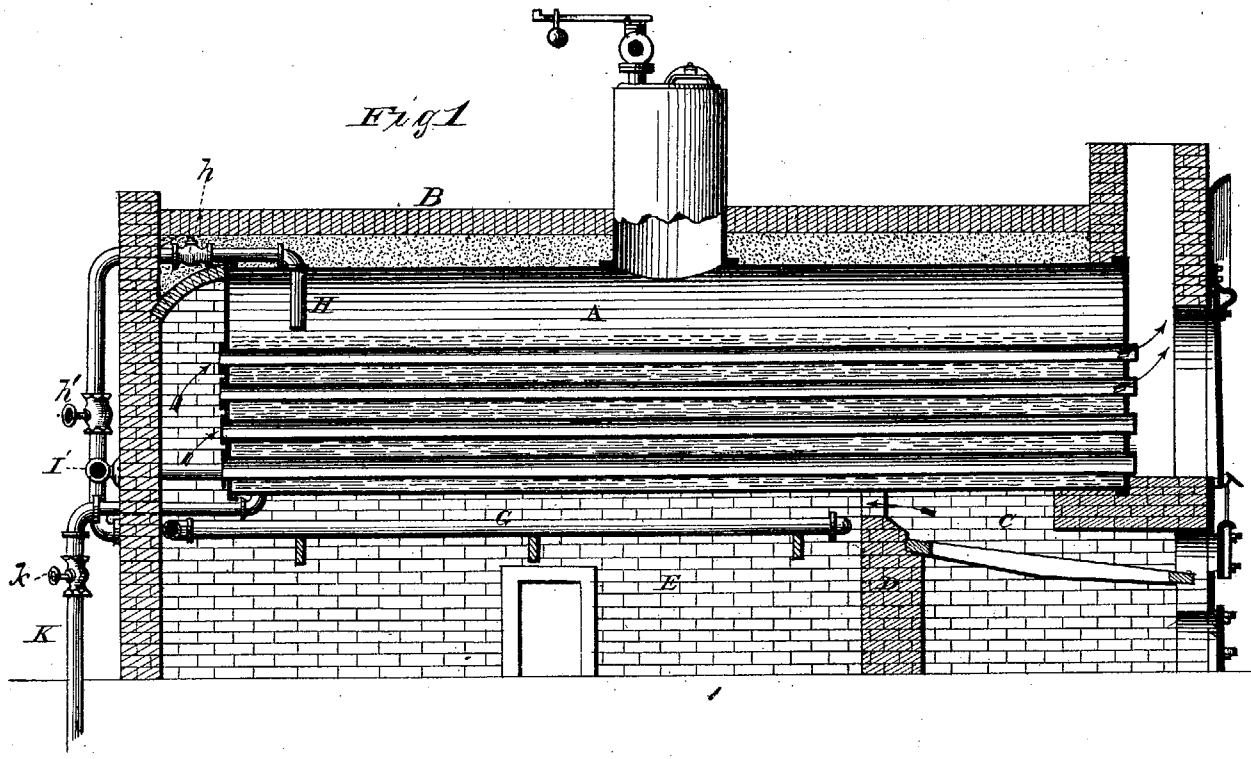
Figure 2:
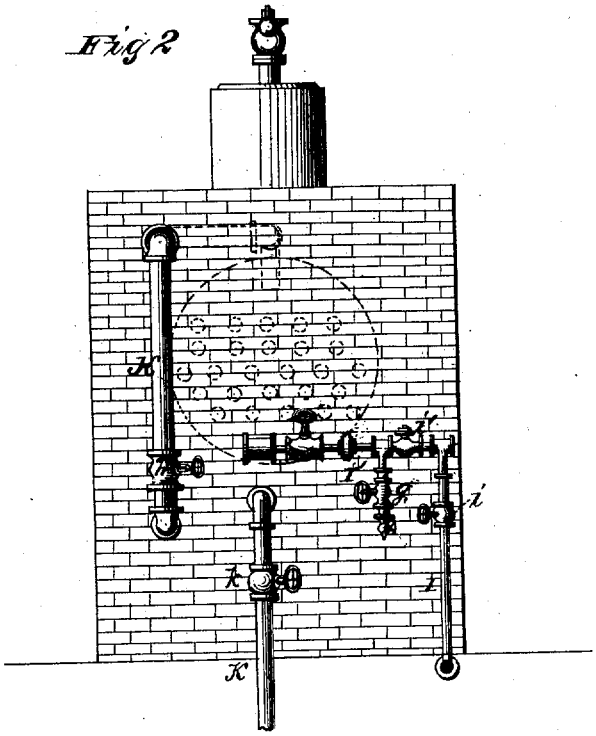
Figure 3:
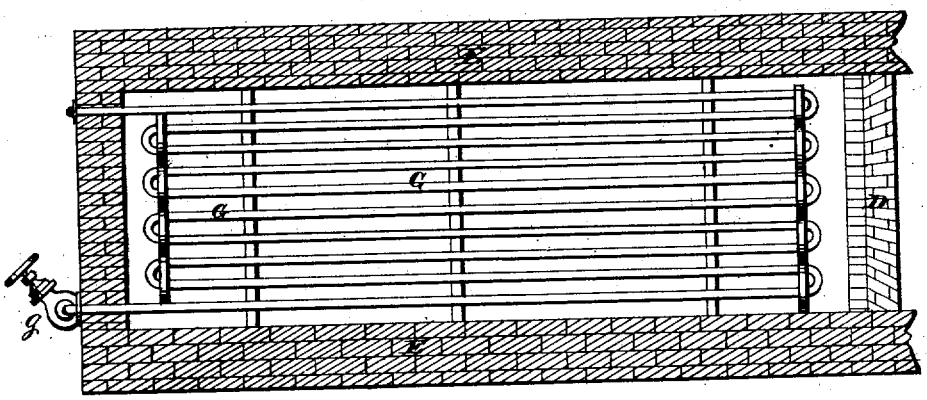

Figure 1 is a longitudinal vertical section of a steam-boiler and furnace embodying my invention. Fig. 2 is a rear end elevation of the same. Fig. 3 is a horizontal section taken immediately below the boiler.

A represents an ordinary tubular boiler, incased within walls B, and heated by a furnace, of which C is the fire-chamber, D the bridge-wall, and E the pit below the boiler. G G represent one or more coils of return-pipe, placed horizontally under the boiler A, on or near the level with the top of the bridge-wall D, and in vertical section may be laid on a right line or in a curve, to correspond with the shape of the boiler, and extending from said bridge-wall to the back wall of the furnace. The feed-water entering by pipe I, provided with usual valve *i*, passes through the connecting joints or pipes into and through said coil or coils G, and through a pipe, H, into the boiler. The spaces between the pipes of the coil allow all cinders and ashes to fall freely into pit E below. The pipe H, which leads the water into the boiler, enters the boiler at the top, and discharges the heated water above the water-line therein. The pipe I′ connects the boiler with the coil, and has a check-valve at *i*′. The blow-off pipe is shown at K.

The valve *i*′ in pipe I′, and valves *g* and *h*, in connection with the pipes in which they are situated, form suitable means whereby the water in the boiler is made to circulate freely through the pipes and coil G in case the feeding of water through the pipe I is interrupted, preventing thereby the burning out of said coil.

While I have shown in my illustration the feed-water and other connections placed at the rear of the boiler, it is evident that the application may be made at any convenient or suitable point, as occasion may require.

This invention tends greatly to make the boiler more durable, less liable to danger of explosion, and more economical in running, for the following reasons: First, the feed-water enters the boiler at an even temperature, much above boiling-point, practically preventing foaming, and, as there is no sudden contraction, leakage on laps or around rivets cannot occur. Second, the water-coil, in combination with the pit, in manner and form as above described, constitutes a combustion-chamber in which nearly all the gases are consumed, and a large percentage of the heat heretofore in many other forms of construction wasted by diffusion and absorption in the surrounding masonry is utilized to a marked degree. Furthermore, in practice, the pipe G is like a coil of rope, so that if it expands in any parts, the balance of the coil will allow for the expansion and contraction. This coil is not liable to injuries from unequal contraction or expansion, because the water circulates through the entire coil; hence there is an equable expansion throughout.

I am fully aware that pipes for various purposes have been placed under steam-boilers; but they have been located wholly or in part in front of the bridge-wall, or in the sides of the furnace, or so as to depend into the flame-chamber, or so as to rest on the close bed of the flame-chamber. My coil is placed entirely in the rear of the bridge wall, and substantially on a line with the top thereof.

Having thus described my invention, what I consider new, and desire to secure by Letters Patent, is—

1. In a stationary steam-boiler, the combination of return-bend pipes G with the bridge-wall and rear wall of the furnace, the said pipes being supported on a skeleton frame, and in line with the top of the bridge-wall, to form an unobstructed and continuous passage from the fire-box to the smoke-box, substantially as and for the purposes specified.

2. In a stationary steam-boiler, the combination, with the return-bend pipes G, supported on a skeleton frame, and arranged in line with the top of the bridge-wall, of a pipe, H, leading from the exit of the system of pipes G to the steam-space of the boiler, substantially as and for the purposes specified.

3. In a stationary steam-boiler, the combination of coil G, located as above described, valve *g*, pipe I′, valve *i*′, with pipe H, valve *h*, substantially as and for the purpose set forth.

In testimony that I claim the foregoing I have hereunto set my hand this 13th day of May, 1876.

JAMES C. STEAD.

Witnesses:
JOHN R. WILLIAMS,
JOHN F. HAYES.